United States Patent
Kumar et al.

(10) Patent No.: US 6,519,226 B1
(45) Date of Patent: Feb. 11, 2003

(54) PACKET NETWORK INTERFACE

(75) Inventors: Vijay P. Kumar, Freehold, NJ (US);
Horng-Dar Lin, Holmdel, NJ (US);
Jay Henry O'Neill, Freehold, NJ (US);
Philippe Oechslin, Lausanne (CH);
Edward Joseph Ouellette, III,
Cambridge, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/098,802

(22) Filed: Jun. 17, 1998

Related U.S. Application Data

(63) Continuation of application No. 08/924,426, filed on Aug. 27, 1997, now Pat. No. 5,898,689, which is a continuation of application No. 08/567,862, filed on Dec. 6, 1995, now abandoned, which is a continuation of application No. 07/985,425, filed on Dec. 4, 1992, now abandoned.

(51) Int. Cl.[7] .............................................. H04L 12/56
(52) U.S. Cl. ...................... 370/230; 370/252; 370/395.1
(58) Field of Search ................................. 370/231, 232, 370/252, 253, 389, 392, 398, 399, 419, 428, 230, 230.1, 395.1

(56) References Cited

U.S. PATENT DOCUMENTS

| | | | | |
|---|---|---|---|---|
| 4,630,266 A | * | 12/1986 | Deparis et al. | 370/94 |
| 5,121,383 A | * | 6/1992 | Golestani | 370/60 |
| 5,142,653 A | * | 8/1992 | Schefts | 379/16 |
| 5,343,463 A | * | 8/1994 | Van Tetering et al. | 370/13 |
| 5,390,188 A | * | 2/1995 | Dawson | 371/20.6 |
| 5,457,700 A | * | 10/1995 | Merchant | 371/27 |
| 5,790,524 A | * | 8/1998 | Bennett et al. | 370/244 |
| 5,793,976 A | * | 8/1998 | Chen et al. | 395/200.54 |
| 5,850,385 A | * | 12/1998 | Esaki | 370/216 |

* cited by examiner

Primary Examiner—Alpus H. Hsu
(74) Attorney, Agent, or Firm—Troutman, Sanders Mays & Valentine; Joseph J. Opalach

(57) ABSTRACT

A method for determining the number of packets lost in a communications network. Marker packets are inserted before and after a predetermined number of packets in a data stream. The number of packets between the inserted marker packets are counted at two different points in the network. Each number of packets counted between the inserted marker packets at the two different points in the network are compared with one another to ascertain the number of packets lost between the two different points in the network.

2 Claims, 2 Drawing Sheets

PACKET NETWORK INTERFACE

This application is a continuation of U.S. patent application Ser. No. 08/924,426, filed on Aug. 27, 1997, now U.S. Pat. No. 5,898,689, issued Apr. 27, 1999, which is a continuation of Ser. No. 08/567,862, filed on Dec. 6, 1995 (now abandoned), which is a continuation of Ser. No. 07/985,425, filed on Dec. 4, 1992 (now abandoned).

TECHNICAL FIELD

This invention relates to packet communications networks. More specifically, this invention relates to interface circuits used in packet communications networks.

BACKGROUND

Broadband integrated services digital networks (B-ISDN) are digital packet networks which may be based upon the asynchronous transfer mode (ATM) protocol being standardized by the CCITT. In ATM, data is transported at 155 Mb/sec, or multiples of 155 Mb/sec, in fixed size cells comprising 53 bytes. Each ATM cell comprises 48 bytes of data to which a 5 byte header is appended. The header of an ATM cell comprises a group of identifiers including a virtual path identifier (VPI) and a virtual channel identifier (VCI) which uniquely specify the call or connection (virtual circuit) to which the cell belongs. When an ATM cell arrives at an input to a switch in an ATM network, its header, containing a VPI and a VCI representing the virtual path and virtual channel to which the cell belongs on an input link to the switch, is examined to determine where the cell is to be routed. The header is also changed so that it contains a new VPI and VCI indicating the virtual path and the virtual channel to which the cell will belong on an output link from the switch.

Existing integrated circuit chips which do this processing are usually called header translation units and perform the following two operations, header modification and manipulation of local routing tags. Header translation units modify one or both of the virtual path identifier and the virtual channel identifier (VPI/VCI) in the ATM header. Prior header translation units typically do a table look up to accomplish this. Specifically, those units include a random access memory containing a new header to be attached to each ATM cell. A predetermined portion of the old header of an ATM cell is used to address the random access memory at the location of the new header for the ATM cell. In addition to providing a new header for each ATM cell; header translation units also may attach a routing tag to each ATM cell to cause an ATM switch to route the cell to an appropriate switch output and output link. The first operation is required by B-ISDN standards to route ATM cells through different virtual paths on different links. The second operation is internal to ATM switches and depends on the type of switch used. These two operations are the minimum operations required for transporting ATM cells through a network. Other operations, however, would be useful in ATM interfaces. Those other operations include inserting cells into and extracting cells from ATM links between ATM switches, policing bandwidth usage of communications channels between ATM switches and communications channels between users and the network, and gathering statistics to evaluate network performance. In the past, these functions, if they were performed at all, had to be performed by separate chips in addition to the header translation unit. Multiple table look ups in random access memories in addition to the table look up in the random access memory of the header translation unit are required. This multiplicity of chips and table look ups results in space consuming and complex circuitry and long time delays in accomplishing the functions described above. In addition, prior circuitry was inflexible in that not all of the ATM header could be used to perform table look up operations. That prior circuitry also did not have convenient facilities for selectively removing ATM cells from a cell stream flowing through an ATM switch or for selectively adding ATM cells to that cell stream. Prior circuitry thus did not lend itself naturally to distributed switch control. It required a central controller which limited cell processing speed.

SUMMARY

The problems described above are solved, in an example of the invention, by an asynchronous transfer mode interface (ATM layer interface) which comprises a content addressable memory responsive to a selectable and predetermined part of an ATM cell received by the interface. The content addressable memory produces an address signal directed to a random access memory which produces at least one parameter block relating to the ATM cell. In one example of the invention, the parameter block comprises a new ATM header for the cell. In another example of the invention, the parameter block comprises a local header to be appended to the ATM cell. In yet another example of the invention, the parameter block may comprise a network usage parameter which can be used to police traffic flow through an ATM network. Typical usage parameters may include a bandwidth usage parameter or a burstiness parameter. Suitable action may be taken to detect and police violations of these parameters by the communications traffic in the network. For example, a leaky bucket algorithm may be implemented to detect network usage violations. In some examples of the invention, an ATM interface circuit may be provided with a local input/output interface which permits selective addition of ATM cells to an ATM cell stream flowing between a main input and a main output of the ATM interface circuit. That local input/output interface also permits selective extraction of ATM cells out of that ATM cell stream. A selective amount of ATM cell processing may thus be performed in hardware in ATM interface integrated circuit chips and a selective amount of ATM cell processing may be performed in software in local control processors. Functions such as header translations, error checking, and policing could be performed in hardware for the most heavily used virtual circuits and in software by the local control processor for the rest of the VCs. This permits an ATM network to use the entire virtual path and virtual circuit space ($2^{28}$ virtual circuits corresponding to the 28 bits in the VCI/VPI field in an ATM header), even though the ATM interface may not have the capacity to hold and process information pertaining to all of the virtual circuits. In addition, signaling and bandwidth management and routing functions would be performed by the local control processor. Distributed control of ATM switches thus is conveniently achieved.

This is only a summary of certain aspects of the invention disclosed in this application. The full scope of the exclusionary right is defined in the claims at the end of the application.

DETAILED DESCRIPTION

Figure 1:
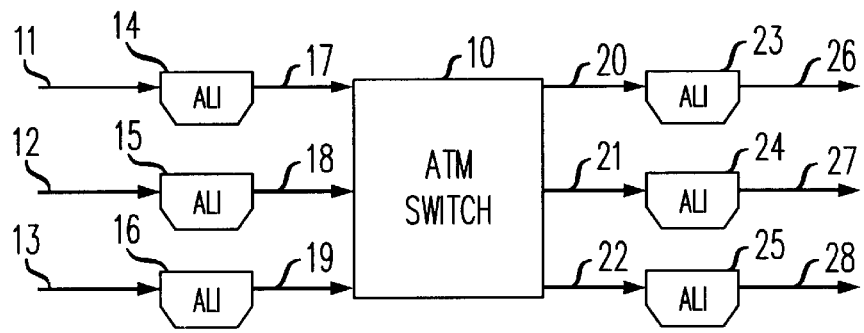
FIG. 1 is a schematic diagram of a number of ATM layer interface circuits in accordance with this invention situated at the inputs and outputs of an ATM packet switch.

FIG. 1 shows a number of ATM layer interface circuits (ALI's) connected to the inputs and outputs of an ATM packet switch 10 used in an ATM communications network. The packet switch 10 may be one of a plurality of interconnected packet switches which typically make up a packet communications network. Each of those switches has respective inputs and outputs and ALI's connected to some or all of those inputs and outputs. Although this description deals with an example of the invention involving an ATM communications network, it should be pointed out that this invention is applicable to any packet network or other similar communications network. The ATM packet switch 10 switches ATM cells received on its inputs to selected outputs. The ATM packet switch 10 may be any switching system used in communications networks using the ATM protocol, such as the ATM packet switch described in "Phoenix: A Building Block Chip For A Fault Tolerant Broadband Packet Switch", Globecom, '91, Phoenix, December 1991, by V. Kumar et al.

ATM cells are directed on input links 11, 12, and 13 to the inputs of ALI's 14, 15, and 16. Those ATM cells are processed by the ALI's 14, 15, and 16 and are directed to the switch 10 on switch inputs 17, 18, and 19, respectively. The switch 10 selectively directs ATM cells it receives on the switch inputs 17, 18, and 19 to appropriate switch outputs 20, 21, and 22. The cells on the switch outputs 20, 21, and 22 are input to ALI's 23, 24, and 25, respectively. The ALI's 23, 24, and 25 process the cells they receive and direct them to output links 26, 27, and 28, respectively. The number of inputs to the switch 10 and the number of outputs from the switch 10, as well as the number of ALI's, shown in FIG. 1 are merely illustrative. Switches having any number of inputs and outputs and using any number of ALIs are applicable to this invention.

The ALI's shown in FIG. 1 can be used to implement user network interfaces (UNI's) as well as network node interfaces (NNI's). Either a general ATM protocol or the ATM protocol for the Phoenix Switching System referred to above may be supported by the ALI's. Illustratively, the ALI's may have 50 MHz eight bit input ports and output ports. As described in detail below, the ALI's may also have a local port which can be a 35 MHz thirty-two bit local port using a shared address/data protocol.

As described in more detail below, the ALI's in FIG. 1 each perform ATM header modification, addition or removal of local routing tags, bandwidth usage policing, local processor interfacing for inserting and extracting ATM cells to and from an ATM link, and gathering statistics for each virtual channel (VC/VP) handled by the ALI.

Figure 2:
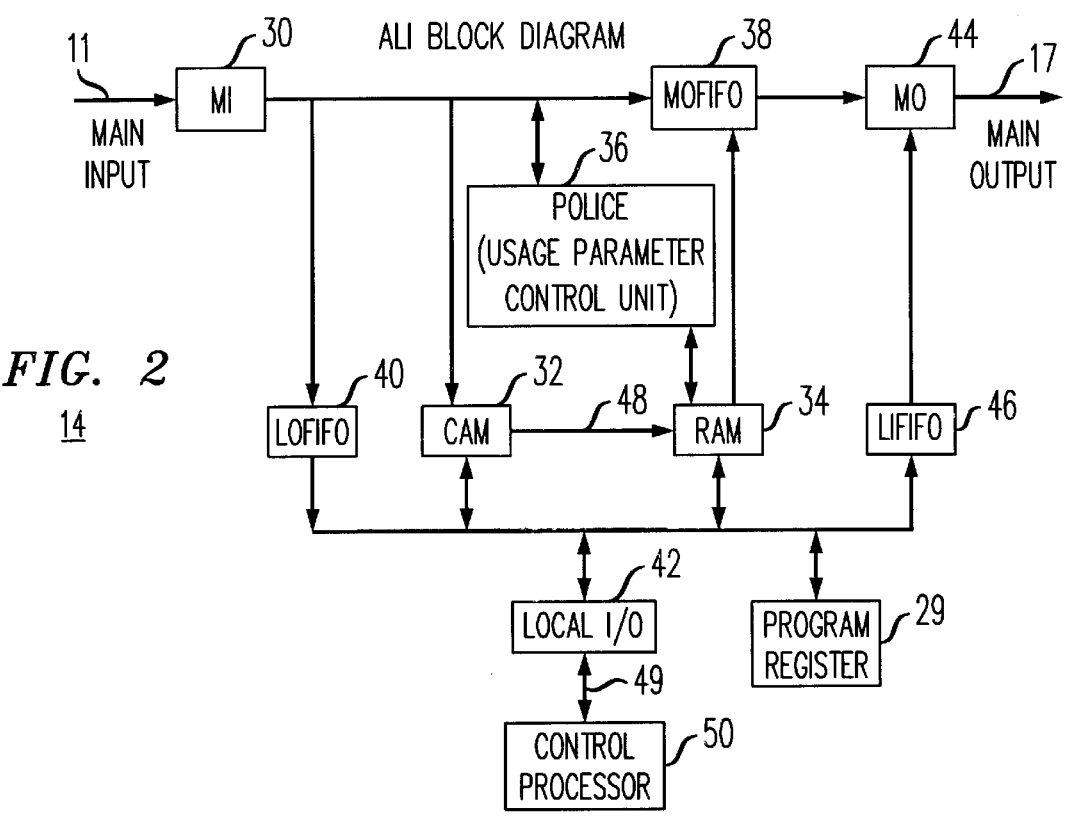
FIG. 2 is a detailed block diagram of one of the ATM layer interface circuits shown in FIG. 1.

FIG. 2 is a detailed block diagram of one of the ALI's 14 shown in FIG. 1. The other ALI's 12, 13, 23, 24, and 25 are similarly constructed. The ALI 14 shown in detail in FIG. 2 comprises a main input 8 where ATM cells are received into the ALI 14 and a main output 17 where the ATM cells leave the ALI 14 after they have been processed. ATM cells can also be extracted or copied from the main cell stream between the main input 8 and the main output 14 to a local interface. ATM cells can also be inserted from that interface into the main cell stream. The main input and the main output can be clocked at two different rates. ATM switches such as the Phoenix Switch described above can run two or three times the speed of the incoming links to reduce blocking within the switch. An ALI at the entry of a switch 10 will then have its output run faster than its input and an ALI at the output of the switch will have its input run faster than its output. The ALI has an output buffer which can hold a predetermined number of ATM cells, for example, ten ATM cells, to smooth cell bursts which leave the ALI slower than they were received. Additional buffering can be provided external to the ALI's. Buffering can also be achieved by diverting the incoming cells via a local interface to a random access memory associated with a local processor and later inserting these cells at an appropriate rate into the outgoing ATM cell stream.

There are two types of ATM cells which can be received at the main input of an ALI and transmitted from the main output of an ALI. Those cells may be plain ATM cells comprising 53 bytes when the ALI is situated at the input of an ATM switch or they may be ATM cells containing a local header (lheader) used as an internal routing tag by an ATM switch when the ALI is situated at the output of the ATM switch. All the ATM cells arriving at the main input must have an lheader of the same length; all the ATM cells leaving the main output must also have an lheader of the same length, which can be different from the lheader length at the main input. Inside the ALI's, ATM cells are handled without one byte of the ATM header which contains the header error check bits (HEC). This HEC code is checked and stripped from the cells as soon as the cells are received and is recalculated and added to the cells before they leave the ALI at the main output. Without this HEC byte, ATM cells have only 52 bytes. The previously mentioned local interface has a bus which may be thirty-two bits wide, thereby requiring thirteen accesses to transfer an ATM cell in an ALI to the local interface.

Consider an ATM cell which arrives at the input to the ALI 14 illustrated in FIGS. 1 and 2. That cell arrives at the input of ALI 14 at 155 Mb/s, its HEC is checked and stripped from the cell, and the cell is stored as a 52 byte ATM cell. As described in more detail below, leaky bucket information belonging to this cell is updated and, in the case of bucket overflow, the cell is either dropped, marked as droppable, or routed to a local interface. If the cell is going to the main output of the ALI, an appropriate local header is attached to the cell so that the cell may be routed to an appropriate switch output. Further, the VCI/VPI field in the header is modified and the cell is stored in an output FIFO in the ALI. As the cell exits the ALI and enters the switch, a new HEC byte is calculated and inserted at the end of the ATM header.

At an output ALI, such as output ALI 23 at the output of the switch 10, the HEC byte is again removed from the ATM header, the ATM header is modified (for example, the ATM header is given a new VPI/VCI field), and a one byte remainder of the local header is removed and replaced by a zero byte local header. The cell then is sent to an outgoing link, such as output link 26, with a new HEC. In this example, the ATM header has been modified twice, once just prior to entering the switch 10 and once just after leaving the switch 10. A cell can have a VCI/VPI which is used inside the switch 10. This feature allows unique ATM headers for every connection within the switch. The unique identifier of each connection can contain the address of its input port or its output port to allow rerouting of cells which may have been misrouted due to faults in the switch.

What follows is a more detailed description of the circuitry shown in FIG. 2. The primary components in the example of the invention shown in FIG. 2 include a 1024 word by 33 bit content addressable memory (CAM) 32 used for a look up operation seeking a match between a stored 28 bit virtual channel/virtual path tag and a corresponding part of an ATM header associated with an ATM cell flowing through the ALI 14. Another primary component of the ALI 14 shown in FIG. 2 is a 1024 word by 128 bit random access memory (RAM) which stores replacement ATM headers and local routing headers. The RAM also stores policing parameters and policing states as well as statistical information relating to the traffic flowing through the ALI 14. The ALI 14 of FIG. 2 also may contain 2,688 bytes of random access memory to implement a number of first in first out (FIFO) buffers. Specifically, those FIFOs may include a 4-priority 8-cell FIFO to buffer bursts, a 4-priority 2-cell FIFO to buffer locally generated ATM cells, and a 2-cell FIFO to buffer cells destined for a local port. The input ATM headers are error-corrected according to the ATM standard and error correction is added to output ATM cells. A program register 29 shown in FIG. 2 is set at start-up and controls the operation of the ALI 14.

The circuit of FIG. 2 includes a main input block 30 which accepts an eight bit data stream at up to 50 MHz and converts it to thirty-two bit data to be stored in FIFOs. The main input block 30 also corrects any single bit error in the ATM header and flags multiple bit errors. It also sequences the operation of a CAM 32, a RAM 34, and a policing unit 36. It also controls the writing of information into a main output FIFO 38 and a local output FIFO 40.

The local output FIFO 40 is a buffer which holds two 56-byte cells, which is written to by the main input block 30 and is read from by a local interface 42. The main output FIFO 38 holds eight cells for each of four priorities. It is written to by the main input block 30 and read from by a main output block 44. A local input FIFO 46 holds two cells for each of four priorities. It is written to by the local interface 42 and read by the main output block 44.

Figure 3:
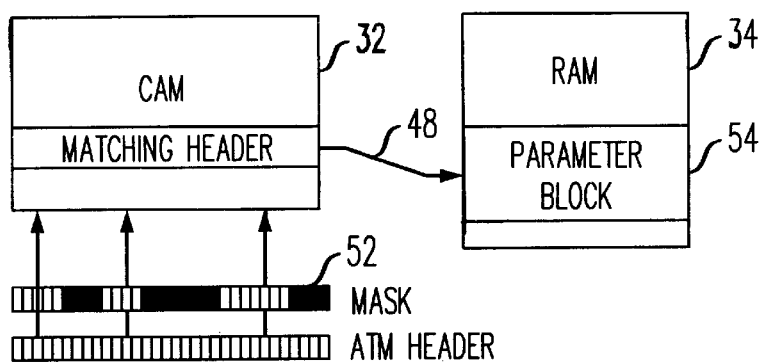
FIG. 3 is a detailed block diagram illustrating the operation of the content addressable memory and random access memory shown in FIG. 2.

The CAM 32 in this example of the invention has 1024 entries, one for each virtual circuit processed in the ALI 14. Each entry comprises a thirty-two bit header pattern and a 1 bit active channel flag. A thirty-two bit header compare mask register (shown in FIG. 3) selects which bits of an incoming header are used to search for a match among active CAM entries. The masked header pattern must match no more than one entry in the CAM 32. A valid match produces a ten bit address signal on line 48 which points to a location in the RAM 34 which contains a parameter block relating to the ATM header which was used to search for a match in the CAM 32. When no match is found, a default RAM address is generated. All 1024 channel flags can be inactivated simultaneously from the local input/output block 42.

The RAM 34 contains 1024 entries in this example of the invention, one entry for each virtual circuit representation stored in the CAM 32. Each entry in the RAM 34 comprises 128 bits, each comprising the following:

1. A 32-bit ATM replacement header;
2. A 32-bit new local routing header;
3. 15 bits of policing parameters specifying a bucket size and a leak rate;
4. 27 bits of policing state information, including a measure of bucket content and at least one time stamp parameter;
5. 2 bits representing a policing mode;
6. A 16-bit cell count parameter;
7. A 2-bit priority field; and
8. A 2-bit routing field.

The ATM replacement header in the parameter block listed above, the incoming ATM cell header, and a thirty-two bit header replacement mask register are used to create a new ATM header which is placed in the local output FIFO 40 or main output FIFO 38, as the case may be, along with the payload associated with the new ATM header. A new local routing header may be added to a cell in the main output FIFO 38.

The policing parameters and the policing state information in the parameter block listed above are used by the policing unit 36 to detect violation of network usage parameters and to update the policing state information. The policing unit 36 operated in one of three modes. The policing mode determines whether an ATM cell which violates the usage parameters in the parameter block is dropped, routed to the local input/output interface 42, or marked as droppable. The cell count in the parameter block listed above keeps track of how many ATM cells have not been dropped for each virtual circuit. The cell count may be included in the header of ATM cells routed to the local input/output interface 42. The priority and routing information in the parameter block are used by the main input block 30 to put the incoming ATM cell in the proper FIFO 38 or 40.

The policing unit 36 implements a leaky bucket procedure or algorithm to insure that virtual circuits do not exceed their allotted bandwidth or burstiness level negotiated at call setup. This leaky bucket procedure is applied to each virtual circuit as an ATM cell for that virtual circuit arrives. It also does this once every 1024 ATM cell periods to prevent the state information from overflowing. If the main output FIFO 38 for the priority of the incoming ATM cell is full, that cell can be routed to the local input/output interface 42 or the ATM cell can be flow controlled by not acknowledging the incoming cell.

The basic function of the main output block 44 is to select an ATM cell for output from the FIFO's 38 and 46. The ATM cell is selected from one of four priorities handled by the main output FIFO 38 or the local input FIFO 46. An empty cell may be selected if both FIFO's 38 and 40 are empty. The main output block 44 calculates an ATM header error correction byte (HEC) and adds it to the outgoing ATM cell. It also converts the thirty-two bit data to eight bit output data on ATM switch input 17 at rates of up to 50 MHz, for example. The actual rate is determined by an external clock connected to the main output block 44.

The local input/output interface block 42 provides an interface to a local control processor 50. Through this interface 42, the program register 29, CAM 32, RAM 34, and mask registers can be written to or read from. In addition, a cell can be read from the local output FIFO 40 and a cell can be written into one of the four priorities in the local input FIFO 46.

The operations of the ALI 14 shown in FIG. 2 are described in greater detail below. The operations of the other ALI's shown in FIG. 1 are similar. The ALI 14 shown in FIG. 2 first identifies each incoming ATM cell by examining the relevant portions of the ATM cell header, namely, the virtual path identifier (VPI) field and the virtual channel identifier (VCI) field. This identification is used to select a corresponding parameter block stored in the RAM 34 from a total of 1024 entries in the RAM 34 in this example of the invention. The parameters within such a block define how the ATM cell is to be processed in the ALI 14. An illustrative parameter block is listed above. Any combination of the thirty-two bits from the ATM header (HEC excluded) can be used to identify an ATM cell. The bits which are actually used to identify a cell are defined by a mask register 52 shown in FIG. 3 which may be located in the CAM 32 or other convenient place between the ATM header and the input of the CAM 32. This mask register 52 is used with respect to an incoming ATM cell to do a look up in the CAM 32 which contains headers for some of the connections. The mask register 52 is configured so that certain of the bits in the ATM header are masked and are not used to search for a match. Those bits correspond to the shaded regions in the mask register 52 shown in FIG. 3. The unshaded regions in the mask register 52 correspond to preselected bits in the ATM header which will be used to search for a match in the contents of the CAM 32. The header bits which correspond to the shaded regions in the mask register 52 are ignored in searching for a match. Matches can be searched using the virtual path identifier bits, the virtual channel identifier bits, or any combination of those bits in the ATM header. It is also possible to use the payload type (PTI) or cell loss priority (CLP) bits to search for a match in the contents of the CAM 32. A look up in the CAM 32 results in an address signal on line 48 between 0 and 1022 if a match has been found. If there is no match, an address signal on line 48 of 1023 is produced. The address signal on line 48 is used as a pointer to a parameter block 54 stored in the RAM 34.

In addition to ATM cell identification, the ALI 14 also modifies the headers of ATM cells flowing through the ALI 14. Two different modifications may be performed on each ATM cell. One such modification is a change to a local header and the other modification is a change to the standard ATM header itself.

Every ATM cell is treated as having a local header associated with it. An ATM cell entering an input ALI, such as an ATM cell entering the ALI 14 from link 11, has a local header of length zero. The ATM cells leaving an input ALI, such as the ALI 14, and entering the ATM switch 10 via a switch input, such as the switch input 17, have a local header of a length between one and four bytes. The ATM cells entering an output ALI, such as an ATM cell entering ALI 23 in FIG. 1 via the switch output 20 from the ATM switch 10, may have a local header having a length of zero to four bytes. (The local header could be modified within the ATM switch 10.) An ATM cell header exiting an output ALI, such as the ALI 23 and leaving a link, such as link 26, has a local header of length zero. The local header associated with an ATM cell is replaced by a new local header or removed entirely. Removing a local header is done by replacing it with a local header of length zero. Adding a local header is accomplished by replacing a zero length local header with a local header of a predetermined nonzero length.

Figure 4:
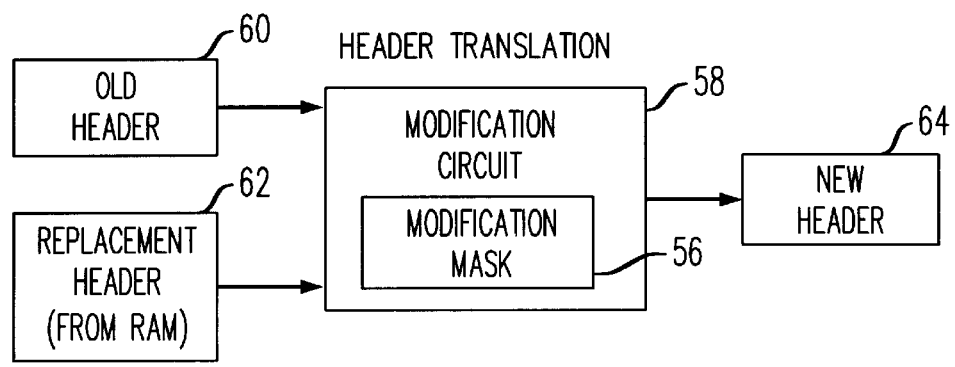
FIG. 4 is a detailed block diagram showing selective ATM header modification by a modification mask register.

Regarding modification of the ATM header itself, the ALI 14 modifies the header for each cell having a header match stored in the CAM 32. A separate modification mask register 56 located in a modification circuit 58 shown in FIG. 4 accomplishes a replacement of selected bits of those ATM headers. The modification circuit 58 may be located, for example, in the main input block 30 shown in FIG. 2. The modification circuit 58 receives an old header 60 obtained from an ATM cell received by the ALI 14 and a replacement header 62 obtained from the parameter block 54 retrieved from the RAM 34. The modification mask register 56 has, for example, thirty-two bits corresponding to the thirty-two bits in an ATM header. The mask register 56 also has a designation, such as a one bit, stored at locations which correspond to the locations in the replacement header which are to be copied into appropriate places in a new header 64. The mask register 56 has a designation, such as a zero bit, stored in places corresponding to locations in the old header which are to be copied into corresponding places in the new header 64. The mask register 56 thereby defines the bits of the old ATM header which have to be replaced. The bits of the old ATM header which are not so defined by the mask register 56 are left unchanged.

Each parameter block contains two routing flag bits which define where a cell is to be routed in the ALI 14. These bits define whether the cell is to be routed to one or both of the main output block 44 and the local input/output interface 42. If the value of the bit corresponding to the main output is one, for example, then the cell is copied to the main output block 44. If the value of the bit corresponding to the local input/output interface is one, for example, then the cell is copied to the interface 42. If both bits are one in this example, then the cell may be copied to both the interface 42 and the main output block 44. If the bits corresponding to both the main output block 44 and the local input/output interface 42 are zero, then the cell may be dropped. Thus, the cell may be copied to one or both of the outputs or be dropped all together.

A parameter block also contains two bits specifying one of four possible priority levels of a cell for which a match has been found. The main output FIFO 38 is composed of four individual FIFO buffers corresponding to the four levels of priority. A cell which is routed to the main output FIFO 38 will be stored in a FIFO buffer corresponding to its specified priority. Cells which are routed to the local input/output interface 42, however, are stored in a single FIFO buffer in the local output FIFO 40. A cell in the FIFO buffer 40 is guaranteed to be delivered to the local control processor 50 before the next cell arrives thus eliminating the need for multiple priorities at the FIFO 40.

There is only one FIFO at the local interface 42. Cells are delivered in 14 words of 32 bits each to the local control processor 50. The first word contains a 10-bit CAM address at which a match was found for this ATM cell. This is the same as the signal on line 48 which is input to the RAM 34 when a match is found. This value can be used directly as a pointer to some data or code stored in the control processor 50 corresponding to the cell. This will avoid additional table look ups in the processor 50. The first word of a cell transfer also may contain the current value of the previously mentioned cell counter in the parameter block from the RAM 34 belonging to this virtual channel and virtual path. The next word contains the ATM header for this cell without HEC bits and the last twelve words contain the payload.

Where a match is not found in the CAM 32, an address signal 1023 is produced on line 48 and a parameter block containing two routing bits is read from the RAM 34 indicating, for example, that this ATM cell is to be routed to the interface 42 to be processed by the local control processor 50. Those cells without a match in the CAM 32 could also be dropped in appropriate circumstances.

In B-ISDN, network usage parameters, such as peak bandwidth and maximum burst length, have to be negotiated at set up time for every new connection. During the communication, these characteristics have to be monitored and some action has to be taken when communications traffic in a connection violates the negotiated parameters associated with that connection. As described above, three possible actions may be taken by an ALI in accordance with this invention in response to a traffic violation, namely, dropping the violating cells, marking the violating cells as droppable (i.e., set the CLP bit to one), and routing every consecutive cell of this connection to the local interface 42. When cells are routed to the local interface 42, they then can be buffered and the traffic reshaped by reinserting these cells into the cell stream at an appropriate rate so that the communication will comply with the negotiated usage parameters.

The policing function of the ALI 14 is based on a leaky bucket procedure which effectively determines whether a cell causes a communication to exceed the negotiated usage parameters. The leaky bucket procedure uses a number of parameters, including a "leak rate" parameter and a "bucket size" parameter. The "leak rate" parameter relates to the peak bandwidth negotiated at the time the connection is established. The "bucket size" parameter determines the maximum permissible burst length at the line rate. In addition, the leaky bucket procedure uses two timing parameters, an "actual time" parameter and a "last" parameter. "Actual time" is a time stamp representing the time when a cell is received for some particular virtual path and virtual channel. "Last" is another time stamp denoting the time at which an immediately prior cell was received for that particular virtual path and virtual channel. The procedure also uses another parameter called "current" which indicates the current level of cells in the bucket.

Every time a cell is received for a given virtual path and virtual circuit, the following operation is performed for that path:

$$current = current + 1 - [(actual\ time - last) * rate]$$

The "current" variable may have any value from zero to the value of the "bucket size" parameter. When the "current" variable exceeds the "bucket size" variable, there has been a violation of a network usage parameter such as the peak bandwidth or burstiness level for this connection negotiated at set up time. The +1 increment identified in the equation above is due to the addition of the cell which has just arrived. "(Actual time−last)*rate" is the total decrement equal to the leak rate times the amount of time which has elapsed since the last bucket level update.

Since "last" is coded using 10 bits in this example of the invention, there must be an update of the bucket level at least once every 1024 cell periods to prevent "(actual time−last)" from becoming ambiguous. This update operation is the following:

$$current = current - (ActualTime - last) * rate,$$

where current≧0
One update operation is performed per cell period. Thus, after 1024 cell periods all connection variables are updated.

There may be a set of predetermined leak rates from which to choose. For example, there may be thirty-two possible leak rates, the maximum rate and three-fourths of the maximum rate each divided by $2^n$ where "n" can be 0 to 15. The maximum rate can be 155 Mb/s or a multiple of this rate, for example.

There is a fifteen bit counter in each parameter block, the content of which represents statistical information about a respective virtual path and virtual circuit stored in the CAM 32. These counters are incremented each time a cell is received for a respective virtual circuit and virtual path and not dropped due to policing. The value of a counter may be appended to every cell transmitted to the local interface 42. This information is useful for network management purposes.

For example, an additional routing can be done using the payload type field (PTI, 3 bits) of the ATM cells. One value of the PTI field can be defined which will result in a copy of its respective cell (a marker cell) being sent to the local interface 42. For example, if this value is set to be the value of F5 end-to-end OAM cells (PTI=101), every time one of these marker cells is sent from one endpoint to the other endpoint of a connection, a copy of the cell will be made in every ALI it goes through. Together with the copy of the cell, the cell counter value for this connection will also be sent to the local interface. These counter values along the path of the communication can then be compared to determine the number of cells lost on each link. The locations of the counters having differing values indicate where losses have occurred and whether those losses occurred due to policing and transmission errors, or due to blocking in the switches, depending on where counter values differ. Cell loss due to policing in an ALI can be distinguished from cell loss due to transmission errors on a link by incrementing a separate counter when cells are dropped due to policing violations detected by an ALI.

ATM cells can be inserted into the ATM cell stream flowing between the main input 30 and the main output 44 in the ALI 14. These ATM cells to be inserted in that cell stream can be presented to the ALI 14 at the local interface 42. Those cells may be directed into one of four FIFO buffers in the local input FIFO 46 depending on the priority level of those cells. An arbitration logic in the main output block 44 selects one FIFO buffer from among the four FIFO buffers in the main output FIFO 38 and four FIFO buffers in the local input FIFO 46 and withdraws a cell for transmission on the main output 17.

The following parameters can be set globally for an ALI chip:

The length of the lheaders at the main input (0–4 bytes);

The length of the lheaders at the main output (0–4 bytes);

The characteristics of the identification mask which select the ATM header bits used to look for a match in the CAM 32.

The characteristics of the modification masks which select the bits of the ATM headers that have to be replaced;

Whether policing is enabled or disabled;

Whether the generation of empty cells when no cells are available at the main output is enabled or disabled; and The value of the payload type (PTI) field of cells that must always be copied to the local interface 42.

Figure 5:
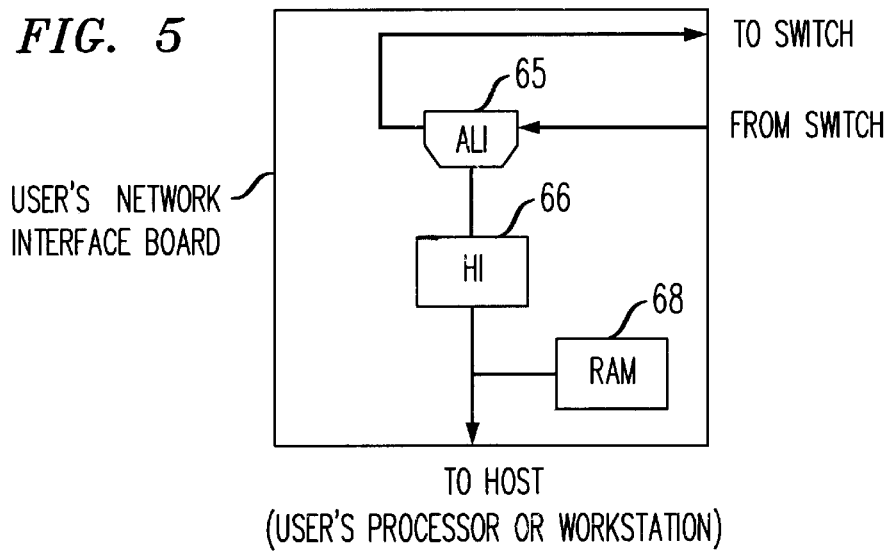
FIG. 5 shows an illustrative user network interface using interface circuitry in accordance with this invention.
Figure 6:
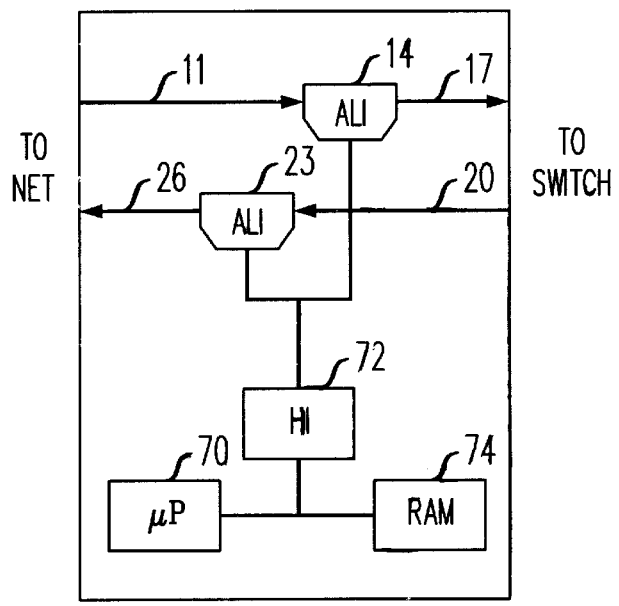
FIG. 6 shows an illustrative network node interface using interface circuitry in accordance with this invention.

FIGS. 5 and 6 illustrate two representative examples of how an ALI like the ones shown in FIGS. 1 and 2 may be used within a user network interface and a network node interface, respectively. The ALIs are accessed for programming and data transfer through their respective local interfaces 42. For high efficiency, a dedicated host interface (HI) chip should be used to transfer cells directly between a RAM and the ALI without interrupting a processor.

The structure of a user network interface (UNI) containing an ALI 65 in accordance with this invention, a host interface 66 and a local RAM 68 is shown in FIG. 5. The apparatus shown in FIG. 5 may be a board plugged into a user's workstation.

The structure of a network node interface is shown in FIG. 6. The NNI of FIG. 6 comprises the ALI 14 and the ALI 23 shown in FIG. 1. The NNI also comprises its own microprocessor 70 which is really the same as the control processor 50 shown in FIG. 2. The NNI finally comprises a host interface 72 and a RAM 74. The NNI combines one incoming ATM link 11, one outgoing ATM link 26, one input 17 to the ATM switch 10, and one output 20 from the ATM switch 10. The NNI can communicate with a user or another NNI via the ATM links 11 and 26. Using the input 17 and output 20 of the ATM switch, the NNI can communicate with the other NNIs connected to the ATM switch. The control and management of the switch can thus be fully distributed among the NNIs connected to the ATM switch.

An interface circuit is described which performs several basic operations useful in building an intelligent network node interface or a user network interface. These functions include modification of a packet header, addition or removal of local header routing tags, detecting and acting upon violations of network usage parameters, insertion and removal of packets from a stream of packets, and statistical information gathering. The interface circuit uses a mask register in conjunction with a content addressable memory to identify connections to which packets belong, allowing any combination of bits in a packet header, such as the 32-bit ATM header, to identify a virtual circuit to which a packet belongs. This approach is flexible and allows one to adapt to developing standards such as the asynchronous transfer mode (ATM) standards.

At the interface circuit's local interface, a channel number is associated with packets of a particular connection which are being routed to a local processor. The local processor can use this channel number as an index to data or a code associated with the packet instead of performing another look up in a table of headers. The interface circuit may be used with a host interface circuit in the implementation of a user network interface or a network node interface. Intelligent network node interfaces allow packet switches such as ATM packet switches to have fully distributed control giving them maximum processing power per link.

What is claimed is:

1. A method for determining whether cells were lost during transmission to an ATM layer interface (ALI) circuit within an ATM network, the method comprising:
   receiving a plurality of cells;
   incrementing a first counter for each cell received during a predetermined amount of time;
   incrementing a second counter for each cell received and not dropped by the ALI circuit due to policing during the predetermined amount of time;
   comparing the first counter value to a first predetermined value to determine the loss of cells due to transmission errors; and
   comparing the second counter value to a second predetermined value to determine the loss of cells due to policing errors within the ALI circuit.

2. A system for determining whether cells were lost during transmission to an ATM layer interface (ALI) circuit within an ATM network comprising:
   an ALI circuit adapted to:
      receive a plurality of cells;
      increment a first counter for each cell received during a predetermined amount of time;
      increment a second counter for each cell received and not dropped by the ALI circuit due to policing during the predetermined amount of time;
      compare the first counter value to a first predetermined value to determine the loss of cells due to transmission errors; and
      compare the second counter value to a second predetermined value to determine the loss of cells due to policing errors within the ALI circuit.

\* \* \* \* \*